(12) United States Patent  (10) Patent No.: US 8,285,105 B2
Laurisch et al.  (45) Date of Patent: Oct. 9, 2012

(54) OPTICAL FIBER COUPLER MODULE

(75) Inventors: Steffen Laurisch, Grunheide (DE);
Klaus Klein, Berlin (DE); Hans-Peter Sandeck, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 12/490,902

(22) Filed: Jun. 24, 2009

(65) Prior Publication Data
US 2009/0257727 A1  Oct. 15, 2009

Related U.S. Application Data

(63) Continuation of application No. 10/553,521, filed as application No. PCT/EP2004/003232 on Mar. 26, 2004, now Pat. No. 7,577,331.

(30) Foreign Application Priority Data

Apr. 16, 2003  (DE) .................................. 103 17 620

(51) Int. Cl.
*G02B 6/00* (2006.01)

(52) U.S. Cl. ......... 385/135; 385/134; 385/136; 385/137

(58) Field of Classification Search .................. None
See application file for complete search history.

(56) References Cited

U.S. PATENT DOCUMENTS

| 5,613,030 | A | * | 3/1997 | Hoffer et al. ................... 385/135 |
| 5,956,449 | A | * | 9/1999 | Otani et al. .................... 385/134 |
| 6,192,180 | B1 | | 2/2001 | Kim et al. |
| 6,418,262 | B1 | | 7/2002 | Puetz et al. |
| 6,424,781 | B1 | | 7/2002 | Puetz et al. |
| 6,504,986 | B1 | * | 1/2003 | Wambeke et al. ............ 385/134 |
| 6,567,578 | B1 | * | 5/2003 | Zhang et al. .................... 385/24 |
| 6,810,193 | B1 | * | 10/2004 | Muller .......................... 385/135 |
| 2002/0051616 | A1 | * | 5/2002 | Battey et al. .................. 385/135 |
| 2002/0181922 | A1 | * | 12/2002 | Xin et al. ...................... 385/135 |

FOREIGN PATENT DOCUMENTS

| DE | 41 19 829 | 12/1992 |
| DE | 42 30 418 | 3/1994 |
| DE | 43 08 228 | 10/1994 |
| DE | 195 08 775 | 9/1996 |
| DE | 297 19 095 | 3/1998 |
| DE | 299 01 931 | 8/2000 |
| DE | 199 43 191 | 4/2001 |
| DE | 201 15 940 | 2/2002 |
| DE | 101 13 528 | 9/2002 |
| EP | 0 531 628 | 3/1993 |
| EP | 0 617 304 | 9/1994 |
| JP | 9-236709 | 9/1997 |
| JP | 2002-236219 | 8/2002 |
| WO | WO 00/05611 | 2/2000 |

* cited by examiner

*Primary Examiner* — Uyen Chau N Le
*Assistant Examiner* — Chad Smith
(74) *Attorney, Agent, or Firm* — Merchant & Gould P.C.

(57) ABSTRACT

A glass-fiber coupler module includes a cassette mount, a mounting panel pivotally coupled to the cassette mount, a front panel coupled to the cassette mount, and a splitter coupled to the second side of the cassette mount. A first side of the cassette mount defines a storage area configured to receive spare lengths of glass fibers. The mounting panel is configured to support a first plurality of couplings. The front panel is configured to support a second plurality of couplings. The splitter is configured to receive glass fibers routed from the second end of at least one of the couplings of the first plurality, the splitter also configured to output at least two glass fibers to the first ends of at least two of the couplings of the second plurality.

22 Claims, 4 Drawing Sheets

OPTICAL FIBER COUPLER MODULE

This application is a Continuation of U.S. Ser. No. 10/553,521, filed 13, Oct. 2006, now U.S. Pat. No. 7,577,331, which is a National Stage of PCT/EP2004/003232, filed 26 Mar. 2004, which claims benefit of Ser. No. 103 17 620.9, filed 16 Apr. 2003 in Germany and which applications are incorporated herein by reference. To the extent appropriate, a claim of priority is made to each of the above disclosed applications.

BACKGROUND

It is increasingly common to wish to use glass-fiber distribution frame inserts with monitoring in glass-fiber distribution frames. The units referred to as coupler modules or monitoring modules are used in 19" mounting racks and can be combined with standard plug modules.

In this regard, it is known for the glass-fiber coupler module to comprise a coupler by means of which the signals of at least one glass fiber are split between at least two outgoing glass fibers, one outgoing glass fiber being used for monitoring purposes. Further, the known glass-fiber coupler modules comprise a first and second group of couplings, the second group of couplings being arranged on the front panel. Plugs coming from the rear of the glass-fiber coupler module are accommodated by the first group of couplings and passed into the coupler via plugs inserted on the opposite side of the coupling. The glass fibers with a plug then run from the coupler to the couplings in the second group. It is often sufficient to monitor only the TX glass fibers. The rear RX glass-fiber plugs are thus inserted directly into the coupling on the front panel. The TX glass-fiber plugs are, on the other hand, inserted into the couplings in the first group and passed via the coupler to the second group of couplings. Owing to the fact that in this manner only half the glass fibers need to be passed to the coupler, the minimum bending radii do not present any problems. One disadvantage of the known glass-fiber coupler module is the maintenance problems associated with it. In the case of glass-fiber coupler modules, after a certain amount of time it is necessary to clean the plugs. Owing to the fact that there is only a small amount of space, it is extremely difficult to remove the plugs inserted in the first and second group of couplings within the housing without the use of a tool. Furthermore, it is nearly impossible to withdraw a plug without touching the adjacent glass fibers and thus influencing their transmission characteristics.

SUMMARY

The invention is therefore based on the technical problem of providing a maintenance-friendly glass-fiber coupler module.

For this purpose, the first group of couplings is arranged on a mounting panel which is arranged on the cassette mount such that it can pivot. This makes it possible for the mounting panel to be pivoted up for maintenance purposes such that the couplings and thus the plugs inserted into the couplings are located on another plane. This makes the plugs in both the first and the second group of couplings freely accessible such that they can be withdrawn, cleaned and reinserted without the need for any tools. The mounting panel can in this case generally be regarded as a suitable mounting body.

In one preferred embodiment, each patch cable coming in from the rear is assigned a coupling in the first group, the couplings preferably all being arranged in a row. The patch cables coming in from the rear of the glass-fiber coupler module are thus simply and easily accessible from the rear, as opposed to the connected-through patch cables of the prior art which are sometimes inserted directly into the couplings in the second group of couplings.

In a further preferred embodiment, all of the couplings in the second group are arranged in a row.

In a further preferred embodiment, elements for accommodating a spare working length of glass fibers are arranged beneath the mounting panel. The spare working lengths make it possible for the plugs to be withdrawn and moved a certain distance away, which considerably simplifies maintenance work.

In a further preferred embodiment, at least one direction-changing element is arranged beneath the mounting panel. This ensures that the glass fibers can be passed into the coupler located below, whilst maintaining the minimum bending radii.

In a further preferred embodiment, the direction-changing element is in the form of an inner limiter. This ensures that when the plugs are withdrawn, the glass fiber, withdrawn from the store containing the spare working length, is not bent with less than the minimum bending radius in the store itself.

In a further preferred embodiment, the inner limiter is provided with at least one retainer. The retainer prevents, in particular, the glass fiber from curling upward when it is pulled and thus from being able to be drawn together above the inner limiter, such that its bending radius is not less than the minimum.

In a further preferred embodiment, cable ducts are arranged on the sides of the mounting panel. The glass fibers can be passed back through these cable ducts from the first group of couplings and into the store region arranged beneath the mounting panel whilst maintaining the minimum bending radii. The glass fibers may likewise be passed back via the cable ducts from the store region or the coupler and be inserted, using plugs, into the couplings in the second group of couplings.

In a further preferred embodiment, the width of the mounting panel with cable ducts is less than or equal to the width of the cassette mount. This makes it possible to use the glass-fiber coupler module according to the invention in standard 19" inserts. The additional cable ducts thus do not increase the overall width of the glass-fiber coupler module, rather the width of the cassette mount which is available anyway is used for routing the glass fibers.

In a further preferred embodiment, a connection part in the form of a panel is arranged between the cable ducts. The connection part on the one hand protects the glass fibers and holds them down and, on the other hand, can be used as a label, for example.

In a further preferred embodiment, the mounting panel to the rear of the cassette panel is provided with V-shaped extensions bent downwards. The V-shaped extensions separate the passed-back glass fibers from the plugs arranged above them in the first group of couplings.

BRIEF DESCRIPTION OF THE DRAWINGS

The invention is explained in more detail below with reference to a preferred exemplary embodiment. In the figures.

DETAILED DESCRIPTION

Figure 1:
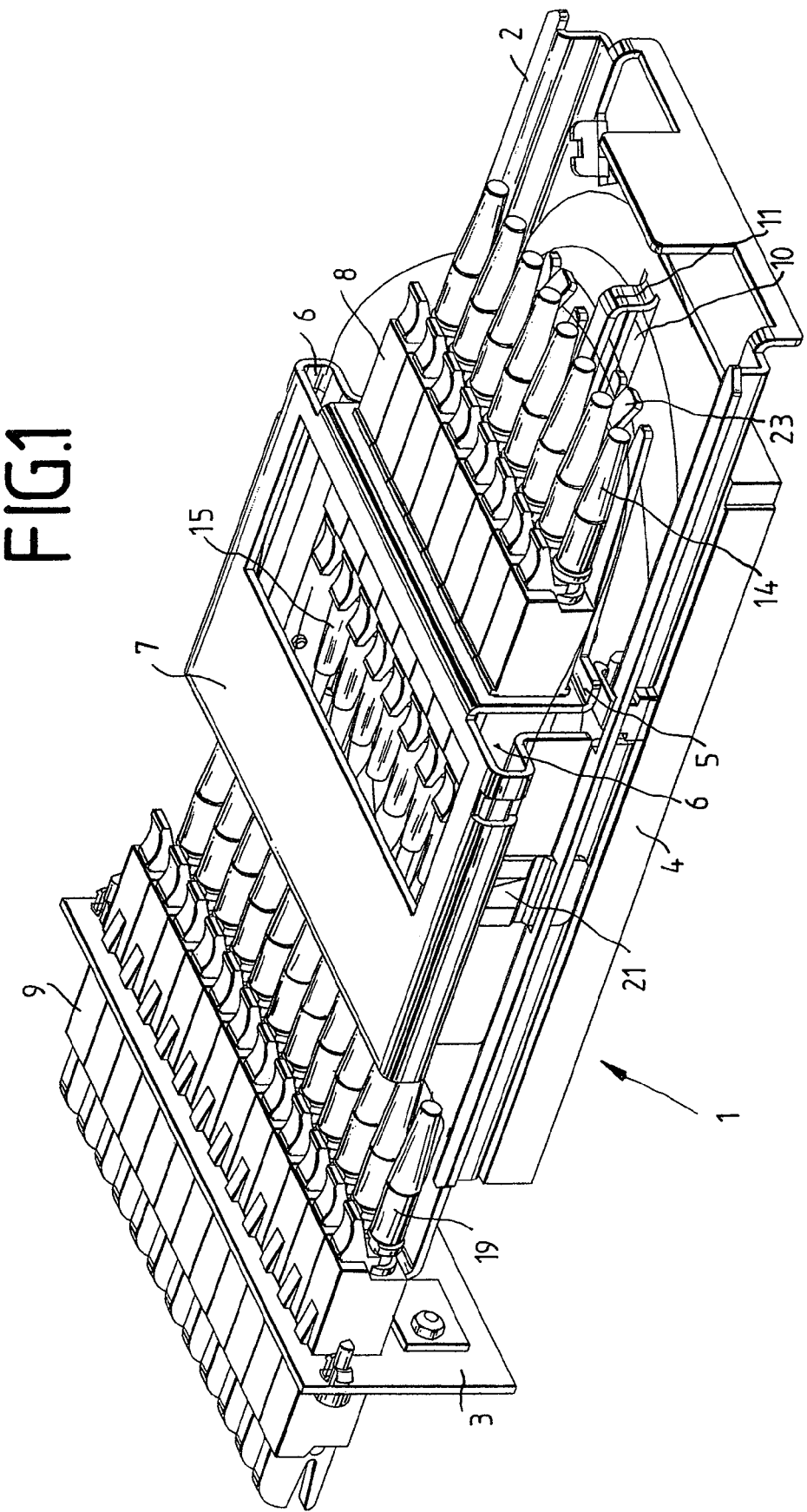
FIG. 1 shows a perspective illustration of a glass-fiber coupler module in the closed state.

FIG. 1 shows the glass-fiber coupler module 1. The glass-fiber coupler module 1 comprises a cassette mount 2 which is connected to a front panel 3. A coupler 4 is arranged beneath the cassette mount 2. A mounting panel 5 is hinged on the cassette mount 2 such that it can pivot. Two cable ducts 6 are arranged on the sides of the mounting panel 5 and a connection part 7 is arranged between these two cable ducts 6. A first group of eight couplings 8 is arranged on the mounting panel 5.

Figure 3:
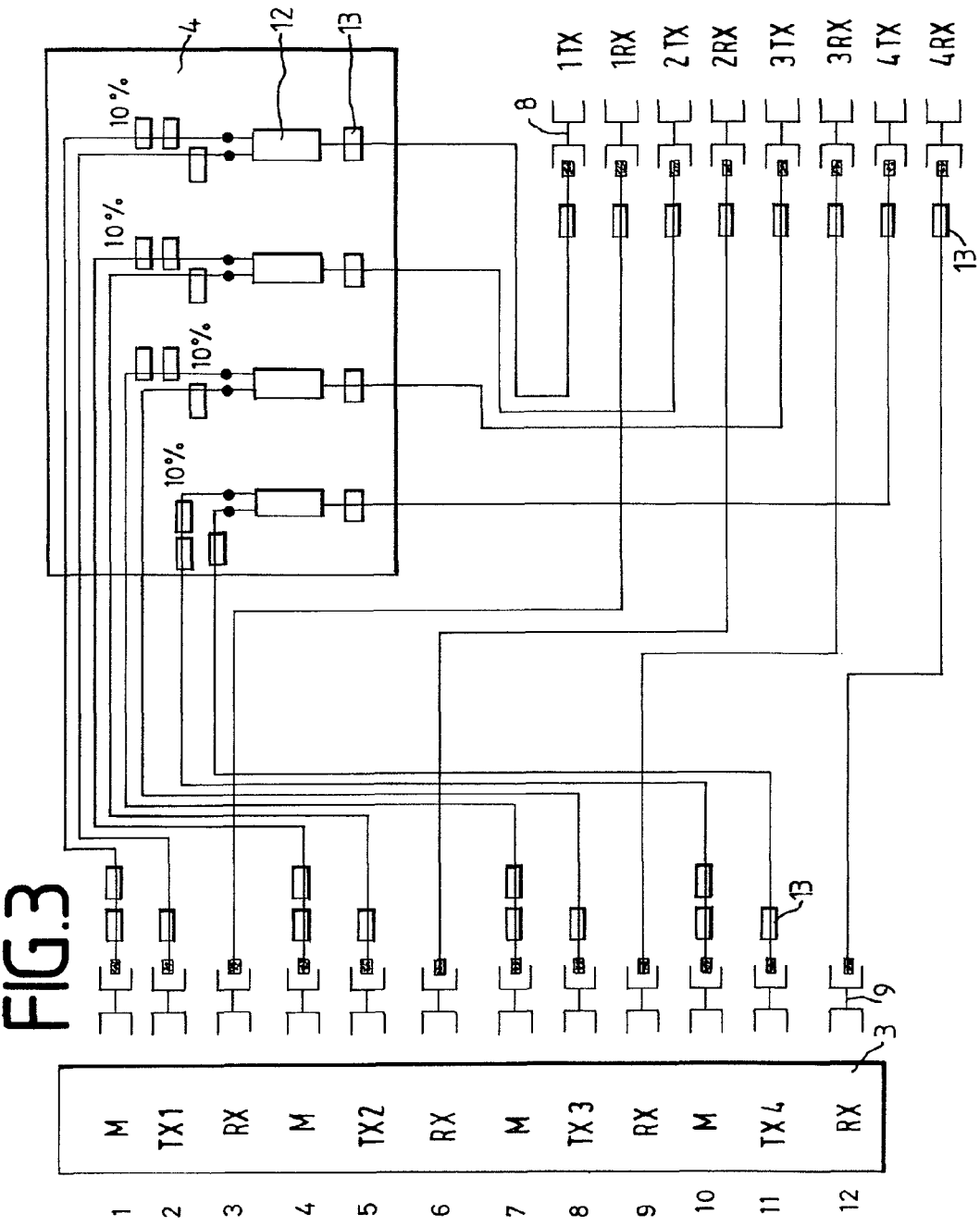
FIG. 3 shows an outline circuit diagram of the glass-fiber connections of the glass-fiber coupler module.

A second group of twelve couplings 9 is arranged on the front panel 3. The cassette mount 2 has a cutout 10 from which a retainer 11 is bent. Before the specific configuration of the glass-fiber coupler module 1 is explained in more detail, the connection of the glass fibers that can be produced in this way will be explained in more detail with reference to FIG. 3.

Eight glass fibers with plugs enter from the rear of the glass-fiber coupler module. In this case, each subscriber is assigned two glass fibers: one for the incoming (RX) and one for the outgoing (TX) signals. These glass-fiber plugs (not shown) are inserted from the rear of the glass-fiber coupler module into the couplings 8. In order to provide monitoring, i.e. monitoring of the glass-fiber connection, the TX glass fibers are passed from the opposite side of the couplings 8 via glass fibers with plugs to the coupler 4. The TX signals are split in the coupler 4 by means of a splitter 12, for example 10% of the light power being coupled into a glass fiber for monitoring purposes. Four incoming glass fibers are thus split up into eight outgoing glass fibers in the coupler 4. If, as shown, no monitoring of the RX glass fibers is provided, these RX glass fibers can be passed via corresponding patch cables from the couplings 8 directly to the couplings 9. The monitoring signals M can then be tapped off by means of plugs inserted from the front of the front panel 3, and can be fed to a monitoring unit. In order to make it easier for the fitter, the individual glass fibers can be identified using colored markings 13. Of course, other types of splitting in the coupler 4 are also possible, for example splitting into three glass fibers. Furthermore, the RX glass fibers may also be included in the monitoring. Likewise, any number of RX and TX glass fibers may be used. Furthermore, a bidirectional glass-fiber connection may also be used.

FIG. 1 shows the plugs 14 inserted from the rear of the glass-fiber coupler module 1 and the outgoing plugs 15 on the first group of couplings 8. The glass fibers arranged on the outgoing plugs 15 are passed back via the cable ducts 6. In this case, the four left-hand glass fibers of the plugs 15 are passed through the right-hand cable duct 6 and the right-hand glass fibers are passed through the left-hand cable duct, which results in a sufficiently large bending radius. A store (shown in FIG. 2) for accommodating a working spare length for the individual glass fibers is located beneath the mounting panel 5. The store comprises an inner limiter 16 having two or more integrated retainers 17. Furthermore, the inner limiter 16 is provided with two openings 18 which, together, form a direction-changing element. The passed-back glass fibers are passed into the store and wound there a number of times. The RX glass fibers are then passed out and inserted into the associated coupling 9 via plugs 19. The TX glass fibers are initially passed into the coupler 4 above after winding and the glass fibers split up by the splitters are passed out again. Subsequently, the glass fibers coming from the coupler 4 are then passed into the coupling 9 by means of the plugs 19. The winding direction of the individual glass fibers can be reversed by means of the direction-changing element such that they can be passed into the coupler 4 with a sufficiently large bending radius. This is particularly the case for individual glass fibers which need to be passed into the coupler 4.

Figure 2:
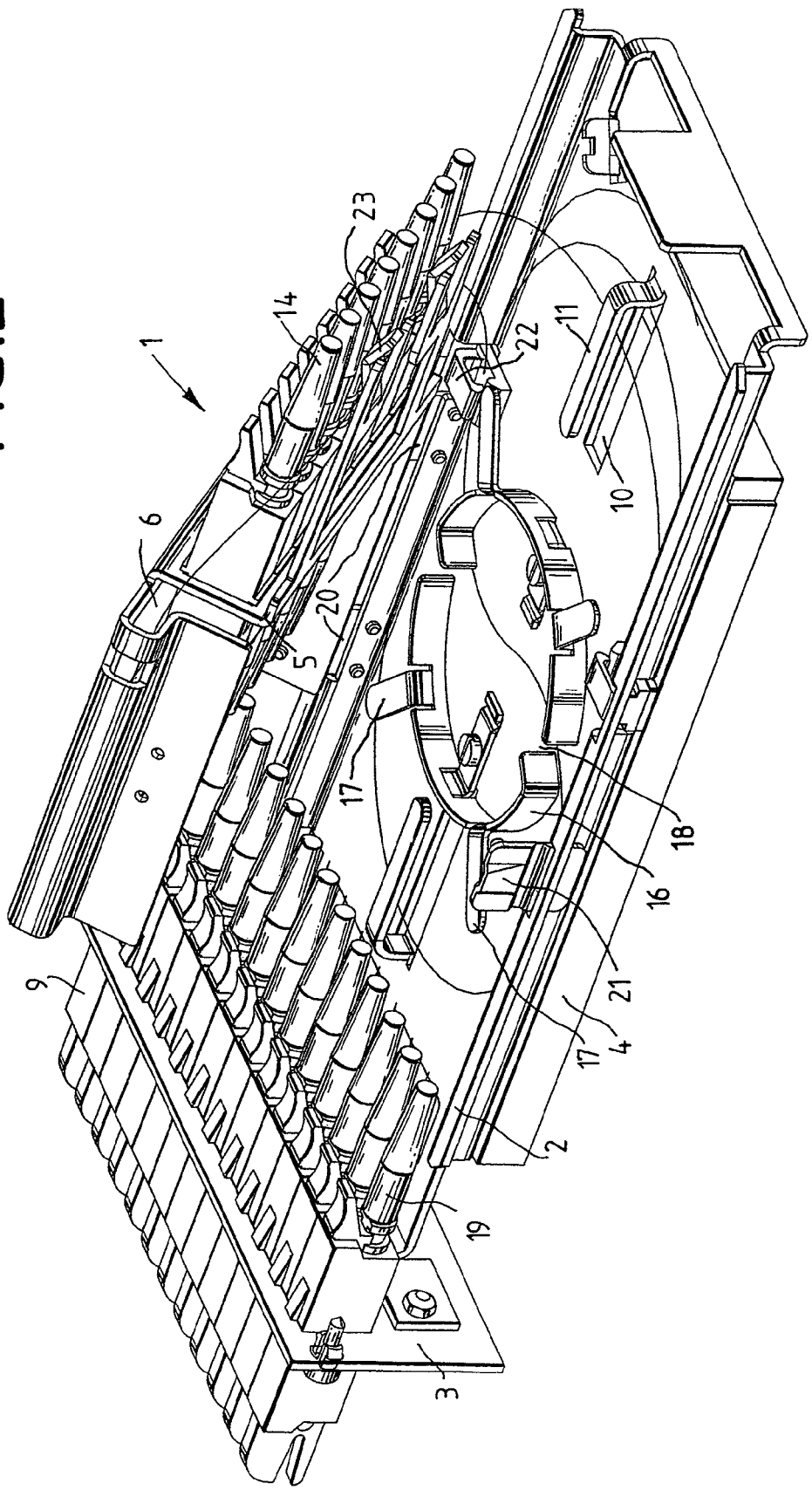
FIG. 2 shows a perspective illustration of the glass-fiber coupler module in a pivoted-up position.

As can further be seen in FIG. 2, the mounting panel 5 with the couplings 8 located on it is hinged on the cassette mount 2 by means of two hinges 20. A locking element 21 is arranged on the opposite side of the cassette mount 2 to the hinges 20. Furthermore, guide elements 22 for the glass fibers are arranged in the store. The mounting panel 5 is provided with extensions in the form of webs in the region of the plugs 14, the extensions 23 in the form of webs being bent back downwards to form a V shape. This prevents the glass fibers coming from the cable duct 6 and those passed back into the cable duct 6 from coming into contact with the plugs 14 and the glass fibers connected to them.

Figure 4:
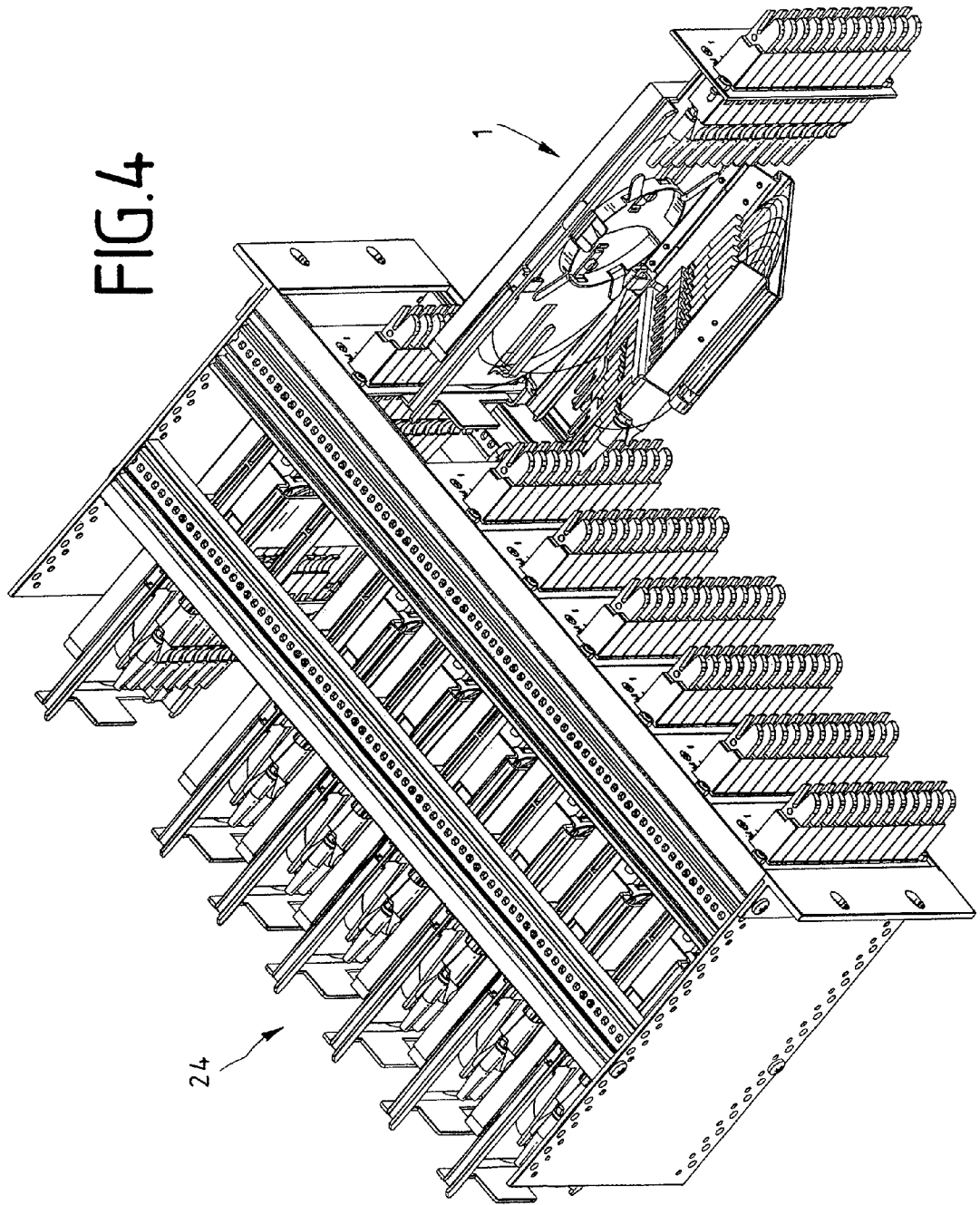
FIG. 4 shows a perspective illustration of a withdrawn and pivoted-up glass-fiber coupler module in a mounting rack.

As can be seen from FIG. 2 in conjunction with FIG. 4, a glass-fiber coupler module 1 arranged in a mounting rack 24 can be withdrawn and the mounting panel 5 can be pivoted up. In this pivoted-up position, the plugs 14, 15 and 19 and, if necessary, the plugs inserted from the front of the front panel are now each freely accessible. The plugs 14, 15, 19 can now be withdrawn, for example, for maintenance purposes and cleaned. When withdrawing the plugs 15 and 19, the fitter now has the working spare length of the glass fibers in the store at his disposal so that the plugs 15, 19 can accordingly be physically removed from the couplings 8, 9.

List of Reference Numerals
1 Glass-fiber coupler module
2 Cassette mount
3 Front panel
4 Coupler
5 Mounting panel
6 Cable ducts
7 Connection part
8 Couplings
9 Couplings
10 Cutout
11 Retainer
12 Splitter
13 Colored markings
14 Plugs
15 Plugs
16 Inner limiter
17 Retainer
18 Openings
19 Plugs
20 Hinges
21 Locking element
22 Guide element
23 Extension
24 Mounting rack

The invention claimed is:
1. A glass-fiber coupler module comprising:
a cassette mount having a first side and an opposite, second side, the first side of the cassette mount defining a storage area configured to receive spare lengths of glass fibers;
a mounting assembly pivotally coupled to the cassette mount, the mounting assembly being configured to pivot from a first position covering the storage area to a second position providing access to the storage area, the mounting assembly being configured to support a first plurality of couplings, each coupling of the first plurality being configured to receive a plug at each of a first end and a second end;

a front panel coupled to the cassette mount, the front panel being configured to support a second plurality of couplings, each coupling of the second plurality being configured to receive a plug at each of a first end and a second end, the second plurality of couplings being more numerous than the first plurality of couplings;

a splitter coupled to the second side of the cassette mount, the splitter configured to receive at least one glass fiber routed from the second end of at least one of the couplings of the first plurality, the splitter also configured to output at least two glass fibers to the first ends of at least two of the couplings of the second plurality for each glass fiber received at the splitter;

a first glass fiber extending from the second end of one of the couplings of the first plurality, the first glass fiber being routed to the first end of a first of the couplings of the second plurality;

a second glass fiber extending from the second end of another of the couplings of the first plurality, the second glass fiber being routed to the splitter;

a third glass fiber extending from the splitter to the first end of a second of the couplings of the second plurality; and a fourth glass fiber extending from the splitter to the first end of a third of the couplings of the second plurality.

2. The glass-fiber coupler module as claimed in claim 1, wherein all of the couplings in the first plurality are arranged in a row.

3. The glass-fiber coupler module as claimed in claim 1, wherein all of the couplings in the second plurality are arranged in a row.

4. The glass-fiber coupler module as claimed in claim 1, wherein the storage area includes at least one direction-changing element.

5. The glass-fiber coupler module as claimed claim 1, wherein cable ducts are arranged on opposite sides of the mounting assembly.

6. The glass-fiber coupler module as claimed in claim 1, wherein the cassette mount is at least as wide as the mounting assembly including the cable ducts.

7. The glass-fiber coupler module as claimed in claim 1, wherein the mounting assembly is configured to be locked into the first position.

8. The glass-fiber coupler module as claimed claim 1, further comprising V-shaped extensions extending from the mounting assembly.

9. A glass-fiber coupler module comprising:
a cassette mount having a front, a rear, and first and second sides extending between the front and rear, the cassette mount also defining an open top opposite a planar surface, the cassette mount defining a storage area on the planar surface, the storage area being configured to receive spare lengths of glass fibers;

a mounting assembly pivotally coupled to the first side of the cassette mount, the mounting assembly being configured to pivot from a first position, in which the mounting assembly covers the open top and faces the planar surface, to a second position, in which the mounting assembly provides access to the storage area through the open top of the cassette mount, the mounting assembly being configured to support a first plurality of couplings; and a front panel coupled to the front of the cassette mount at a position spaced from the mounting assembly, the front panel being configured to support a second plurality of couplings that are positioned in a row generally parallel to the first plurality of couplings, the second plurality of couplings extending forwardly of the cassette mount and the mounting assembly.

10. The glass-fiber coupler module as claimed claim 9, wherein the second plurality of couplers remain stationary with respect to the cassette mount.

11. The glass-fiber coupler module as claimed claim 9, wherein the mounting assembly extends across the cassette mount from the first side to the second side when the mounting assembly is in the closed position.

12. The glass-fiber coupler module as claimed claim 9, further comprising a coupler mounted to the cassette mount, the coupler including at least one optical splitter.

13. The glass-fiber coupler module as claimed claim 12, wherein the coupler is mounted to an opposite side of the planar surface of the cassette mount from the storage area.

14. The glass-fiber coupler module as claimed claim 9, wherein the first plurality of couplings has a 2:3 relationship with the second plurality of couplings.

15. The glass-fiber coupler module as claimed claim 14, wherein the first plurality of couplings has eight couplings and the second plurality of couplings has twelve couplings.

16. A glass-fiber coupler module having a length extending between a front and a rear and having a width extending between a first side and a second side, the coupler module comprising:
a cassette mount extending between the first and second sides of the coupler module, the cassette mount also defining the rear of the coupler module;

a mounting assembly pivotally coupled to the cassette mount at the first side of the coupler module, the mounting assembly supporting a first plurality of couplings, the mounting assembly having a length that is less than the length of the coupler module, the mounting assembly being configured to pivot the first plurality of couplings from a first position, in which the first plurality of couplings extends in a row between the first and second sides of the coupler module, to a second position, in which the row of couplings extends at an angle to the cassette mount; and a front panel coupled to the cassette mount at the front of the coupler module, the front panel extending across the cassette mount between the first and second sides of the cassette mount, the front panel holding a second plurality of couplings stationary with respect to the cassette mount.

17. The glass-fiber coupler module as claimed claim 16, further comprising a coupler mounted to the cassette mount, the coupler including at least one optical splitter.

18. The glass-fiber coupler module as claimed claim 17, further comprising a storage area positioned on an opposite side of the cassette mount from the coupler.

19. The glass-fiber coupler module as claimed claim 17, wherein the second plurality of couplings are positioned in a row generally parallel to the first plurality of couplings.

20. The glass-fiber coupler module as claimed in claim 1, wherein the first plurality of couplings has a 2:3 relationship with the second plurality of couplings.

21. The glass-fiber coupler module as claimed in claim 20, wherein the first plurality of couplings has eight couplings and the second plurality of couplings has twelve couplings.

22. The glass-fiber coupler module as claimed in claim 20, wherein the splitter is configured to unequally split incoming signals carried by the glass fiber received at the splitter onto the glass fibers output from the splitter.

* * * * *